United States Patent
Brehob et al.

(10) Patent No.: US 6,244,047 B1
(45) Date of Patent: Jun. 12, 2001

(54) METHOD OF PURGING LEAN NO$_x$ TRAP

(75) Inventors: Diana Dawn Brehob; Todd Arthur Kappauf; Jeffrey Scott Hepburn, all of Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/165,729

(22) Filed: Oct. 2, 1998

(51) Int. Cl.$^7$ ........................................ F01N 3/00
(52) U.S. Cl. ............... 60/295; 60/274; 60/285; 60/297
(58) Field of Search ............... 60/274, 285, 286, 60/295, 297, 301, 276

(56) References Cited

U.S. PATENT DOCUMENTS

| | | | |
|---|---|---|---|
| 5,437,153 | * 8/1995 | Takeshima et al. | 60/276 |
| 5,595,060 | * 1/1997 | Togai et al. | 60/274 |
| 5,642,705 | * 7/1997 | Morikawa et al. | 60/300 |
| 5,735,119 | * 4/1998 | Asanuma et al. | 60/276 |
| 5,826,425 | * 10/1998 | Sebastiano et al. | 60/274 |
| 5,839,275 | * 11/1998 | Hirota et al. | 60/285 |
| 5,941,211 | * 8/1999 | Brehob et al. | 123/325 |
| 5,975,046 | * 11/1999 | Kaneko et al. | 123/300 |
| 6,041,592 | * 3/2000 | Huynh et al. | 60/274 |

FOREIGN PATENT DOCUMENTS

| | | |
|---|---|---|
| 0 849 441 A1 | 6/1998 | (EP) . |
| 0 884 458 A2 | 12/1998 | (EP) . |
| 0 931 923 A1 | 7/1999 | (EP) . |
| 2 334 348 | 8/1999 | (GB) . |
| 2 335 510 | 9/1999 | (GB) . |
| WO 99/35386 | 7/1999 | (WO) . |

* cited by examiner

Primary Examiner—Thomas Denion
Assistant Examiner—Binh Tran
(74) Attorney, Agent, or Firm—Allan J. Lippa

(57) ABSTRACT

A method of purging a NO$_x$ trap, located in the exhaust passage of a direct injection engine, is proposed that provides transition from a lean fuel mixture to a rich fuel mixture in a single engine cycle without substantial change in the engine air flow. This is accomplished by substantially increasing the fuel flow rate, while retarding the spark in order to avoid any noticeable change in torque. The increased amount of fuel delivered during purge emits substantially more reducing species than in previous strategies and accordingly the required duty cycle may be substantially reduced while still obtaining the same reduction of NO$_x$ without any fuel economy penalty.

8 Claims, 3 Drawing Sheets

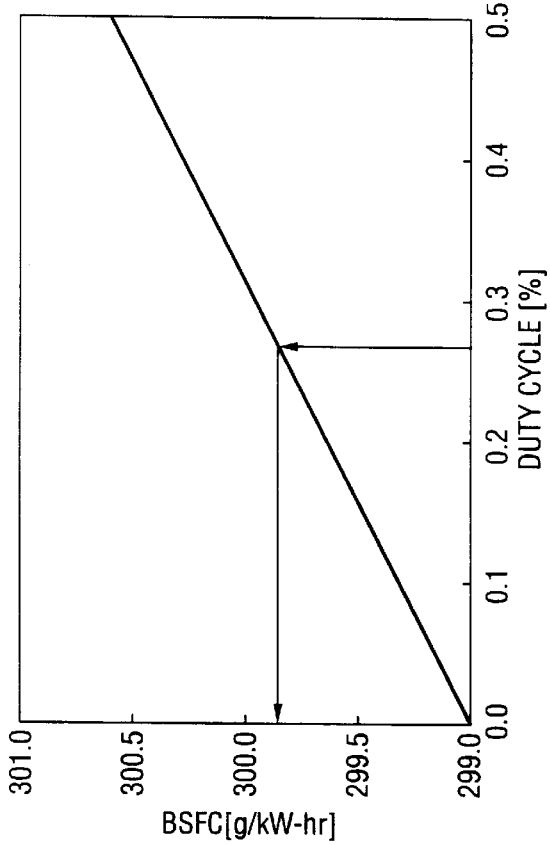
Fig. 3
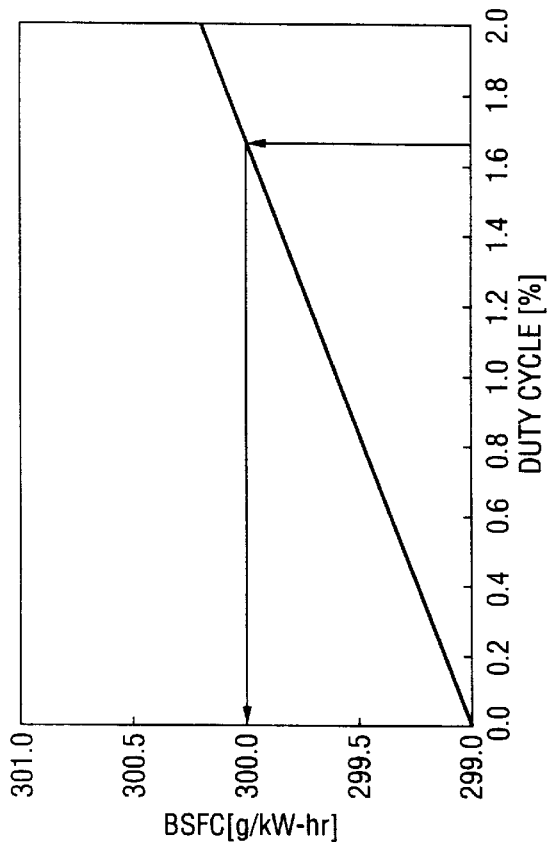
Fig. 2
| | RPM | TORQUE [N-m] | MAP bar | Spk Adv deg bTC | BSFC g/kW-hr | Air-Fuel ratio | Reducing species | | | Reducing reducing potential |
|---|---|---|---|---|---|---|---|---|---|---|
| | | | | | | | m(CO) mg/cycle | m(H2) mg/cycle | m(O2) mg/cycle | |
| FILL | 1500 | 10.8 | 0.75 | 16.5 | 299 | 30.6 | 0.67 | 0.024 | 39.37 | Oxidizing environment |
| PURGE 1 | 1500 | 10.8 | 0.43 | 20 | 359 | 13.4 | 3.39 | 0.121 | 0.92 | 1.00 |
| PURGE 2 | 1500 | 10.8 | 0.70 | -10 | 615 | 11.5 | 19.96 | 0.713 | 0.90 | 6.21 |
Fig. 4

METHOD OF PURGING LEAN NO$_x$ TRAP

TECHNICAL FIELD

This invention relates to vehicle emission control and, more particularly, to a method of controlling a direct injection engine to capitalize on opportunities presented by direct injection to accomplish lean NOx trap regeneration rapidly and frequently and with fewer changes to engine operating conditions.

BACKGROUND OF THE INVENTION

Lean NO$_x$ traps operate cyclically. During the lean portion of the cycle (fill duration), NO$_x$ is adsorbed. After running lean for a period of time, the trapping efficiency becomes low and the trap must be regenerated. This is done by operating rich of stoichiometric. The hydrocarbons and CO emitted during rich operation causes the NO$_x$ to reduce to N$_2$ and O$_2$. The lean part of the cycle may typically last for one minute followed by the regeneration or purge part of the cycle for one second.

It is desirable that the transition between the fill and purge portions of the cycle be imperceptible to the driver. Accordingly, the prior art strategies provide for a relatively slow transition between the fill and purge portions of the cycle. Of the transitions that must occur, including fuel flow and spark changes, the most difficult transition is the manifold pressure change. The throttle (or other valve) must be closed rapidly to accomplish the lean to rich and rich to lean transition. Even after the throttle has attained the appropriate position, it takes a few cycles for the intake manifold to fill or to purge, depending on the transition. Thus, the transition occurs over a number of engine cycles. Because of the number of parameters which must be changed, it is a challenge to do this robustly and with no torque fluctuation. Furthermore, the ramping of the conditions which are required to get to and from the purge condition negatively impacts fuel economy.

SUMMARY OF THE INVENTION

In accordance with the present invention a method of purging a NO$_x$ trap is proposed that provides for transitions between lean and rich fuel mixture conditions without substantial change in the manifold pressure. Thus, neither the throttle angle nor manifold filling are issues. This is accomplished by substantially increasing the fuel flow rate, i.e., the amount of fuel delivered, while retarding the spark in order to avoid any noticeable change in torque. The increased amount of fuel delivered during purge emits substantially more reducing species than in previous strategies. Thus, the required duty cycle may be substantially reduced while still obtaining the same reduction of NO$_x$ without paying any fuel economy penalty.

The method of the present invention is intended for operation with a direct-injection engine where the amount of fuel delivered in the combustion chamber can be changed on a cycle-by-cycle basis. The method would not be as effective in a port-injected engine because of fuel hangup on manifold surfaces. With direct injection, the purge cycle can be as short as one engine combustion event. As the trapping efficiency of the NO$_x$ trap diminishes with time during a trap cycle, it is desirable to purge often to keep the trapping efficiency at its highest. As will be explained more fully hereinafter, the purge time could be scheduled for a single engine cycle following 375 engine cycles of fill. An advantage of the short interval between purges is that the NO$_x$ trapping efficiency is improved. A further advantage is better fuel economy due to elimination of relatively slow transition phases. Also, the severe spark retard used in practicing the present invention, causes the exhaust gas temperature to increase markedly providing higher exhaust enthalpy and helping to keep the NO$_x$ trap active by maintaining a higher temperature.

BRIEF DESCRIPTION OF THE DRAWINGS

A more complete understanding of the present invention may be had from the following detailed description which should be read in conjunction with the drawings in which:

FIG. 2 is a chart of fuel consumption versus NO$_x$ trap duty cycle according to the prior art;

FIG. 3 is a chart of fuel consumption versus NO$_x$ trap duty cycle using the method of the present invention;

FIG. 4 is a table of data comparing the present invention with the prior art;

DETAILED DESCRIPTION OF PREFERRED EMBODIMENT

Figure 1:
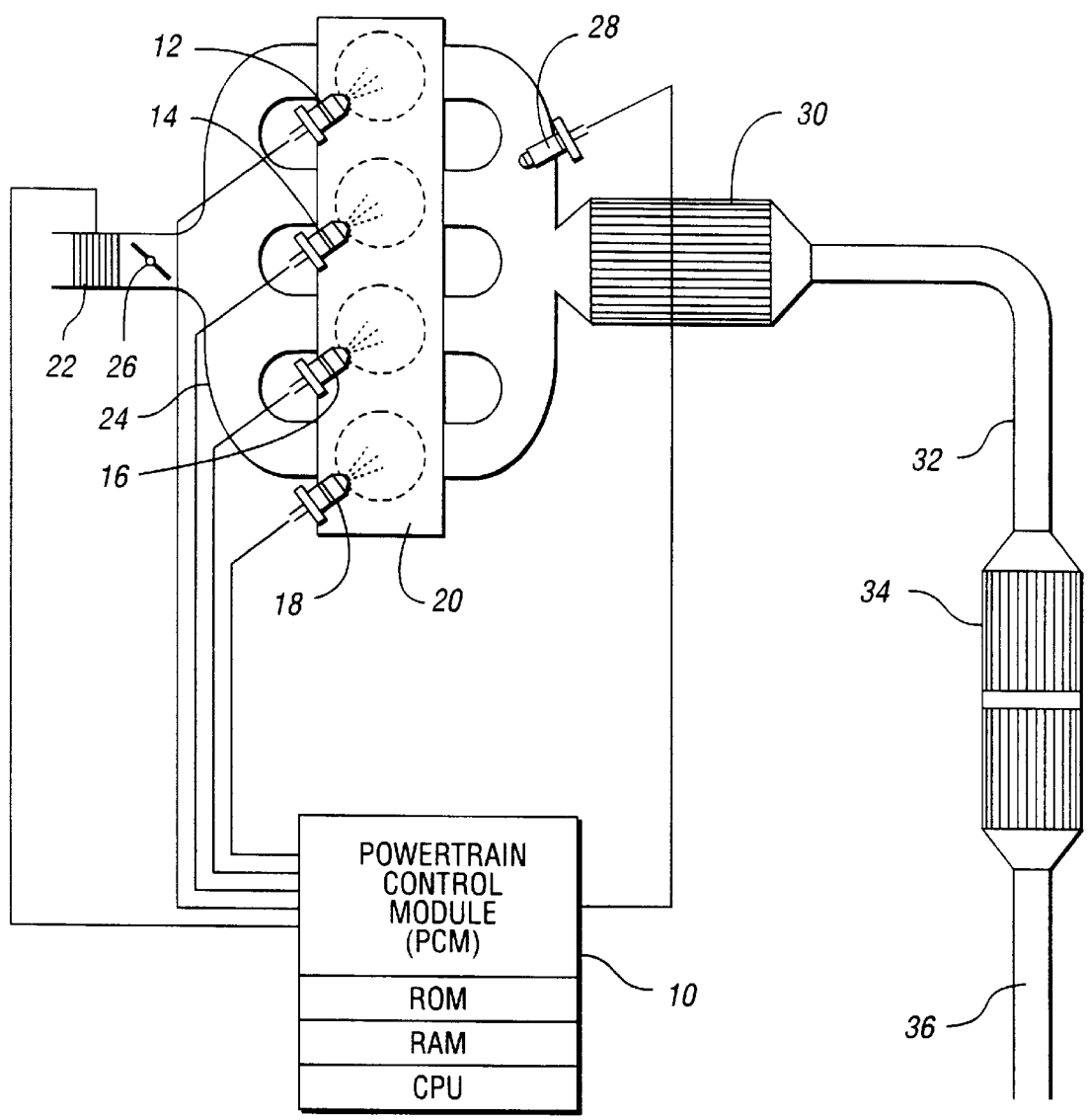
FIG. 1 is a schematic block diagram of a system for practicing the method of the present invention.

Referring now to the drawings, and initially to FIG. 1, a schematic block diagram of an engine control system for carrying out the method of the present invention is shown. The system includes a powertrain control module (PCM) generally designated 10. The PCM is an electronic engine controller including ROM, RAM and CPU as indicated. In the example shown, the PCM controls a set of injectors 12, 14, 16 and 18 which inject fuel into a four-cylinder direct injection gasoline engine 20. The fuel injectors are of conventional design and are positioned to inject fuel into their associated cylinder in precise quantities as determined by the controller 10. The controller 10 transmits a fuel injector signal to the injectors to maintain an air/fuel ratio (A/F) determined by the controller 10. An air meter or air mass flow sensor 22 is positioned at the air intake of the manifold 24 of the engine and provides a signal regarding air mass flow resulting from positioning of the throttle 26. The air flow signal is utilized by controller 10 to calculate an air mass (AM) value which is indicative of a mass of air flowing into the induction system in lbs./min. A heated exhaust gas oxygen (HEGO) sensor 28 detects the oxygen content of the exhaust gas generated by the engine, and transmits a signal to the controller 10 to control engine A/F during stoichiometric operation.

An exhaust system, comprising one or more exhaust pipes, transports exhaust gas produced from combustion of an air/fuel mixture in the engine to a conventional close coupled three way catalytic converter (TWC) 30. The converter 30, contains a catalyst material that chemically alters exhaust gas that is produced by the engine to generate a catalyzed exhaust gas. The catalyzed exhaust gas is fed through an exhaust pipe 32 to a downstream NO$_x$ trap 34 and thence to the atmosphere through a tailpipe 36.

Other sensors, not shown, provide additional information about engine performance to the controller 10, such as crankshaft position, angular velocity, throttle position, air temperature, etc as well as driver demand information such as accelerator pedal position. The information from these sensors is used by the controller to control engine operation as is well know in the art.

Typical steady-state engine out emissions and fuel economy for a fill condition and a conventional purge condition (PURGE1), are shown in the table of FIG. 4. In a conventional $NO_x$ trap cycle, the brake specific fuel consumption (BSFC) during the lean portion of the cycle is about 299 g/kW-hr. The purge portion of the cycle negatively impacts fuel economy, having a BSFC of about 359 g/kW-hr. Because the purge part of the cycle has a duty cycle of only 1.66%, (1 sec./1 min.) the BSFC of the cycle is 300 g/kW-hr, as shown in FIG. 2.

It will be noted that significant changes occur in the transition between the FILL and PURGE1 operational modes depicted in the table of FIG. 4. The fuel flow changes from 0.498 g/s to 0.598 g/s, the spark changes from 16.5 to 20 degrees before top center, and the manifold pressure change from 0.75 to 0.43 bar absolute pressure. In order to achieve the manifold pressure change, the throttle must be closed rapidly and even after the throttle has attained the appropriate position, it takes a few engine cycles for the intake manifold to fill or to purge, depending on the transition. In order to avoid abrupt or noticeable changes in engine torque the transition in these engine operation parameters must be made over a number of engine cycles.

Figure 5:
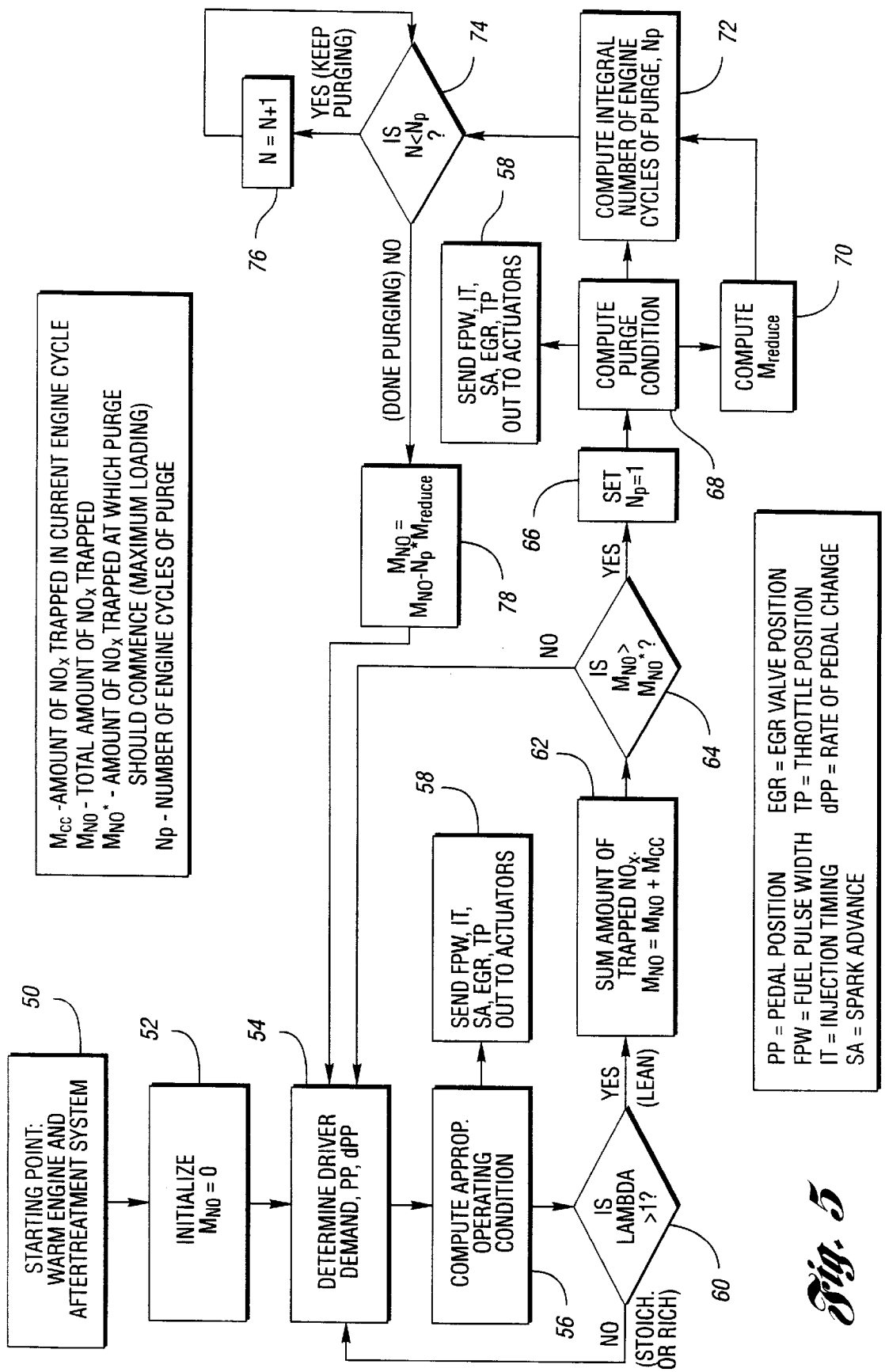
FIG. 5 is a flowchart of the method of the present invention.

Referring now to FIG. 5, a flowchart depicting the method of the present invention is shown. The starting point of the chart assumes that the engine and after-treatment system is warmed-up as indicated in block 50. At block 52, a $NO_x$ accumulator $M_{NO}$, for estimating the amount of $NO_x$ stored in the trap, is initialized. At block 54, the driver's demand, based on accelerator pedal position and rate of change of pedal position, is determined and used in block 56 to compute the appropriate signals to be applied to the various actuators listed in block 58, in order to achieve the desired operating conditions. If lambda($\lambda$) is less than or equal to 1, indicating a rich or stoichiometric A/F, as determined in decision block 60, then the normal closed loop A/F control is followed. Otherwise, the engine is running lean and the amount of $NO_x$ trapped during the last engine cycle is added to the previous accumulated total in block 62. If the accumulated total does not exceed a predetermined maximum trap loading or capacity, as determined in decision block 64, then the lean operation is continued at block 54. On the other hand, if the predetermined trap capacity is exceeded, a purge cycle counter N is initiated to a value of 1 at block 66. At block 68, the values desired for purging the trap are computed and sent to the appropriate actuator. The conditions governing purge determined in block 68 include:

a) Throttle position (TP) and thus manifold pressure, is maintained constant;

b) Exhaust Gas Recirculating (EGR) valve position is maintained constant;

c) Injection timing (IT) is sufficiently early during the intake stroke so that a nominally homogeneous mixture of fuel and air is attained by the time of spark firing;

d) The fuel pulse width (FPW) is increased to give the desired A/F. This A/F should be as rich as possible while avoiding a rich misfire condition (taking into consideration production tolerances and typical cylinder-to-cylinder, air/fuel ratio variability) and no richer than required to purge the trap in a single engine cycle;

e) Spark advance (SA) is selected so that torque (and hence, rpm) is maintained at a substantially constant level. Because the FPW is increased markedly in the purge condition, SA is retarded from that which would provide the highest torque.

The amount of $NO_x$ reduced during the present engine cycle ($M_{reduce}$) is computed in block 70 and used in block 72, to determine the total number of engine cycles of purge ($N_p$) needed to purge the trap. $M_{reduce}$ is a function of lambda and the mass flow rate of air and may be obtained from a lookup table or by solving an equation for computing $M_{reduce}$ as a function of lambda and mass flow rate of air. Lambda is the value set in block 68. The integral number of cycles of purge is determined at block 72, where $N_p=(M_{NO}/M_{reduce})+S$, where S is a safety margin value of 0 to 0.5. Np is the integral portion of the resultant of this equation. If the total number of engine cycle of purge $N_p$ is equal to or greater than N (one) as determined at block 74, purging is continued and the N counter is incremented at block 76 until its value is less than $N_p$ at which time purging is terminated. At block 78 $M_{no}$ is set to $M_{no}-N_p*M_{reduce}$ or 0 whichever is greater.

The important differences between a purge condition representative of prior art strategies (PURGE1) and a representative example of the present invention (PURGE2) are summarized in the table of FIG. 4. The manifold pressure (and thus the throttle position) of PURGE2 substantially equals that occurring during trap filling. In contrast, a standard purge (PURGE1) requires the manifold pressure to be reduced significantly, necessitating closing the throttle. For the example conditions during PURGE2, the timing is severely retarded (12 degrees after top dead center) to maintain an engine torque substantially equal to that during trap filling. In addition, the air/fuel ratio of PURGE2 is much richer than that of PURGE1, increasing the amount of reducing species and allowing a much more rapid purging of the $NO_x$ trap. From the table it will be seen that the reducing potential of PURGE2 is 6.2 times that of PURGE1 on a per cycle basis (calculated based on the mass of reductants minus oxidants emitted). PURGE1 requires a change in manifold pressure, or throttle position. Manifold pressure changes require more than several engine revolutions (thus, many engine cycles) to accomplish. During this transition, changes in fuel flow, spark advance, EGR rate, and other parameters must be managed by the engine's computer. In contrast, PURGE2 maintains a constant manifold pressure and could be as short as one engine combustion event (engine cycle) with minimal impact on driveability. Both the increased mass of reductants and the ability to purge for a single engine cycle with PURGE2 allows frequent purge events of very short duration. As the NOx trap is most efficient following a purge, the method of the present invention facilitates operating the NOx trap at its higher trapping efficiencies more often. Typically, PURGE1 would be operated for about 1 second out of each 60 seconds (1.66% duty cycle). Because PURGE2 emits 6.2 times as much reductants, the duty cycle can be reduced to a 0.27% duty cycle. Instead of operating 1 second, PURGE2 can be operated for one engine cycle every 375 engine cycles (1/0.27%). These are representable data for a single operating condition. The data shows a manifold pressure of 0.70 bar and a fuel flow rate, i.e., amount of fuel delivered during purge of more than double that delivered during the PURGE1 condition.

While the best mode for carrying out the present invention has been described in detail, those familiar with the art to which this invention relates will recognize various alternative designs and embodiments for practicing the invention as defined by the following claims.

What is claimed is:

1. A system for purging a $NO_x$ trap located in an exhaust passage of a direct injection engine comprising:

means for determining accumulated amount of $NO_x$ stored in said trap during a fill portion of a $NO_x$ trap cycle;

means for controlling engine air flow; and means for initiating a purge portion of said $NO_x$ trap cycle when the amount of $NO_x$ stored in the trap exceed a predetermined amount, by abruptly changing the A/F of a mixture supplied to said engine from a lean A/F mixture to a rich A/F mixture during a single engine cycle without substantially changing engine air flow.

2. The system of claim 1 wherein said rich A/F mixture is rich enough to purge the trap in a single engine cycle without causing a misfire.

3. The system of claim 2 further comprising means for determining the number of engine cycles required to purge the trap at said rich A/F mixture and means for selecting spark timing to avoid any noticeable changes in engine torque.

4. A method of purging $NO_x$ from a $NO_x$ trap located in the exhaust passage of an internal combustion engine comprising the steps of:

determining an accumulated amount of $NO_x$ stored in the $NO_x$ trap;

if said accumulated amount of $NO_x$ exceeds a predetermined amount, abruptly increasing the amount of fuel delivered to a cylinder of said engine to cause an abrupt change in engine operation from a lean air/fuel ratio to a rich air/fuel ratio in the cylinder, said abrupt change of engine operation occurring during a single engine cycle, said rich air/fuel ratio being no richer than is sufficient to purge the $NO_x$ trap in a single engine cycle but as rich as possible without causing a rich misfire; and retarding the timing of firing a spark plug disposed in said cylinder of said engine to avoid any substantial change in torque that would otherwise result from said abrupt change in engine operation.

5. The method of claim 4 comprising the further steps of:

maintaining a substantially constant EGR valve position and a substantially constant throttle position during said abrupt change in engine operation; and determining the number of engine cycles required to purge the $NO_x$ trap at said rich air/fuel ratio.

6. The method of claim 5, further comprising the steps of:

determining whether the accumulated $NO_x$ is substantially purged from the $NO_x$ trap and if so, abruptly decreasing the amount of fuel delivered to a cylinder of the engine to cause an abrupt change in engine operation from rich air/fuel ratio to lean air/fuel ratio in the cylinder.

7. A system of purging $NO_x$ from a $NO_x$ trap located in the exhaust passage of an internal combustion engine comprising:

fuel delivery means for delivering fuel to a cylinder of said engine;

means for determining an accumulated amount of $NO_x$ stored in the $NO_x$ trap and for controlling said fuel delivery means to abruptly increase the amount of fuel delivered to a cylinder of said engine to cause an abrupt change in engine operation from a lean air/fuel ratio to a rich air/fuel ratio in said cylinder if said accumulated amount of $NO_x$ exceeds a predetermined amount;

said abrupt change of engine operation occurring during a single engine cycle, said abrupt change of engine operation occurring during a single engine cycle, said rich air/fuel ratio being no richer than necessary to purge the $NO_x$ trap in a single engine cycle but as rich as possible without causing a rich misfire; and means for retarding the timing of firing a spark plug disposed in said cylinder of said engine to avoid any substantial change in torque that would otherwise result from said abrupt change in engine operation.

8. An article of manufacture comprising:

a computer storage medium having a computer program encoded therein for causing the computer to control a multi-cylinder engine with a $NO_x$ trap located in the exhaust passage thereof, said computer storage medium comprising:

code for determining an accumulated amount of $NO_x$ stored in the $NO_x$ trap;

code for abruptly increasing the amount of fuel delivered to a cylinder of said engine to cause an abrupt change in engine operation from a lean air/fuel ratio to a rich air/fuel ratio operation in the cylinder if said accumulated amount of $NO_x$ exceeds a predetermined amount;

said abrupt change of engine operation occurring during a single engine cycle, said abrupt change of engine operation occurring during a single engine cycle, said rich air/fuel ratio being no richer than necessary to purge the $NO_x$ trap in a single engine cycle but as rich an air/fuel ratio as possible without causing a rich misfire; and code for retarding the timing of firing a spark plug disposed in said cylinder of said engine to avoid any substantial change in torque that would otherwise result from said abrupt change in engine operation.

* * * * *